United States Patent [19]
Gras et al.

[11] 4,313,876
[45] Feb. 2, 1982

[54] PRODUCTION OF ISOPHORONEDIISOCYANATE ADDUCTS CONTAINING FREE NCO-GROPS AND NCO-GROUPS END BLOCKED WITH ε-CAPROLACTAM

[75] Inventors: Rainer Gras; Elmar Wolf, both of Herne, Fed. Rep. of Germany

[73] Assignee: Chemische Werke Huls Aktiengesellschaft, Marl, Fed. Rep. of Germany

[21] Appl. No.: 165,206

[22] Filed: Jul. 1, 1980

[30] Foreign Application Priority Data

Jul. 19, 1979 [DE] Fed. Rep. of Germany ....... 2929224

[51] Int. Cl.³ .......................................... C07D 223/10
[52] U.S. Cl. .................... 260/239.3 R; 260/453 AR; 260/453 SP; 260/453 AB
[58] Field of Search ................................ 260/239.3 R

[56] References Cited

U.S. PATENT DOCUMENTS 4,211,699 7/1980 Winkelmann et al. ...... 260/239.3 R

FOREIGN PATENT DOCUMENTS

| 2732062 | 2/1978 | Fed. Rep. of Germany ... 260/239.3 R |
| 2293989 | 7/1976 | France .......................... 260/239.3 R |
| 51/65137 | 6/1976 | Japan ............................. 260/239.3 R |
| 1391066 | 4/1975 | United Kingdom . |

Primary Examiner—Robert T. Bond
Attorney, Agent, or Firm—Oblon, Fisher, Spivak, McClelland & Maier

[57] ABSTRACT

Isophoronediisocyanate adducts containing free NCO-groups and NCO-groups end blocked with ε-caprolactam and method for their production.

5 Claims, No Drawings

PRODUCTION OF ISOPHORONEDIISOCYANATE ADDUCTS CONTAINING FREE NCO-GROPS AND NCO-GROUPS END BLOCKED WITH ε-CAPROLACTAM

BACKGROUND OF THE INVENTION

1. Field of the Invention

The present invention relates to a method for producing compounds with high latent isocyanate content, and free, non-blocked isocyanate groups and the partially blocked compounds produced according to this method.

2. Brief Description of the Prior Art

Capped isocyanates, also called isocyanate yielders, are long known compounds (Houben-Weyl, Methods of Organic Chemistry XIV/2 S. 61–70, published in 1963). The following are known blocking agents: ε-caprolactam, tertiary alcohols, phenols, aceto-acetic esters, malonic acid esters, hydrogen, cyanide.

These capped isocyanates have the characteristic of reacting like isocyanates at high temperatures. The deblocking is easier the more acid the hydrogen atom of the masking group is. In contrast to the free isocyanates, mixtures with hydroxyl group-containing substances (and solvents) can be produced with capped isocyanates without causing a reaction when mixed or dissolved at a relatively low temperature, i.e. below the deblocking temperature. Thus, it is possible to produce storage-stable mixtures with products containing hydroxyl groups such as high molecular polyesters, hydroxy acrylates or polyethers with capped polyisocyanates, which do not enter into the desired isocyanate reaction until higher temperatures, i.e. at or above the deblocking temperature of the adducts. They are of considerable importance in the production of caoutchouc elastic products by way of storable intermediate steps, as well as in the production of paints, especially powder paints for metal painting.

Pulverizeable poly-epoxides were the first binding agents to generate interest as the raw materials for powder paints. Phenol-capped isocyanates were first mentioned as new raw materials for powder paints in German DL-PS No. 55 820 (published May 5, 1967, East Germany) in 1965. Powdered mixtures of high melting polyesters containing hydroxyl groups and polyisocyanates whose isocyanate groups are blocked by phenol can be applied to substrates by electrostatic spraying, and hardened through heat to form coatings. The disadvantages of this method are conditioned on phenol separation: strong odor, operating disturbances, particularly caused by the formation of bubbles.

According to the teachings of German DE-OS No. 1 957 483, Federal Republic of Germany, published Nov. 15, 1969 these disadvantages are avoided by using ε-caprolactam-capped polyisocyanates instead of the phenol-capped compounds mentioned above. However, for many applications the reactivity of the systems described there, of ε-caprolactam-blocked aliphatic diisocyanates with hydroxyl group-polyesters is not sufficient, not even in the presence of catalysts.

SUMMARY OF THE INVENTION

It has now been discovered that polyisocyanate adducts of isophoronediisocyanate only partially blocked with -caprolactam, containing more than 0.1 but no more than 1.0 mole of free NCO-groups per mole of polyisocyanate adduct, cause hardening of combinations containing hydroxyl groups at significantly lower temperatures.

DESCRIPTION OF THE PREFERRED EMBODIMENTS

Surprisingly only a few % by weight of the ε-caprolactam used to block in crosslinking reactions, e.g. in paint compositions, are given off into the environment. This fact can only be explained by the fact that in the first reaction step the free NCO-groups react with the inducted Zerevitinov-active compounds. The blocking agent (ε-caprolactam) is displaced in the second reaction step and remains predominantly enclosed in the polyurethane plastics.

The compositions according to the invention are solid, melt at 60°–150° C., are well tolerated by most polyesters containing hydroxyl groups, and produce homogeneous melts at about 80°–120° C.

Therefore, the object of the invention is to provide a method for producing isophoronediisocyanate adducts containing free NCO-groups and NCO-groups end blocked with ε-caprolactam, wherein the isophoronediisocyanate adducts ε-caprolactam are used in such proportional relationship that 0.1 to 1 mole, and particularly 0.1–0.4 mole, of NCO-groups remain free per mole of isophoronediisocyanate adduct.

According to the invention the isophoronediisocyanate adduct can comprise isophoronediisocyanate and low molecular di and polyols which will be described more closely hereinbelow.

The isophoronediisocyanate adduct can also comprise trimerized isophoronediisocyanate alone or in a mixture with monomer isophoronediisocyanate and can have an NCO-content of 17–35% by weight.

The isophoronediisocyanate adduct can also comprise isophoronediisocyanate containing urea (carbonyldiamide) and have an NCO-content of 22–35% by weight.

The isophoronediisocyanate adduct can comprise isophoronediisocyanate containing biuret groups and have an NCO-content of 20–35% be weight.

The isophoronediisocyanate adduct can comprise an isophoronediisocyanate containing carbodiimide groups and have an NCO-content of 22–35% by weight.

The isophoronediisocyanate adduct can comprise an isophoronediisocyanate adduct exhibiting urea(carbonyldiamide) and urethane groups of isophoronediisocyanate and 1-hydroxy-3-aminoethyl-3,5,5 trimethylcyclohexane.

The invention also has as its object adducts exhibiting isophoronediisocyanate with free and with ε-caprolactam blocked NCO-groups, as produced according to the invention.

Examples of basic compounds suited for the production of compositions according to the invention are: reaction products of low molecular diols or polyols (ethylene glycol, 1,4-butanediol, 1,6-hexanediol, neopentyl glycol, diethylene glycol, triethylene glycol, dipropylene glycol, diethanol methylamine, triethanolamine, trimethanol-propane or -ethane, pentaerythrol) with isophoronediisocyante (NCO/OH=2:1) or polyisocyanates exhibiting isocyanurate groups which are available in known manner through trimerization of isophoronediisocyanate (Great Britain Pat. No. 1,391,066 published Apr. 16, 1975, German DE-OS No.

2 325 826 Federal Republic of Germany, published Dec. 19, 1974). The catalyst system of triethylenediamine (Dabco ®) Propylene oxide is particularly suited for the trimerization of isophoronediisocyanate. The trimerization can be done in substance or in inert organic solvents. Trimerization consists essentially of breaking off the reaction at a given NCO-content, e.g. preferably when 30–50% of the NCO-groups have reacted under trimerization. The isophoronediisocyanate that has not reacted is separated from the isocyanurate by thin layer distillation.

Pure isophoronediisocyanate has an NCO-content of 37.8%. The theoretical NCO-value of the trimerized isophoronediisocyanate is 18.9%, in practice it is 16–18%.

In the method according to the invention the available isocyanurate-triisocyanates can be used either as the exclusive isocyanate components or in a mixture with isocyanurate-free isophoronediisocyanate. The addition of isocyanurate-free isophoronediisocyanate makes it easy and simple to vary the characteristics of the products of the method, particularly their melting point, their glass softening temperature and their viscosity as desired.

It is particularly advantageous in the method according to the invention to use the in situ produced triisocyanate mixture mentioned above, which is available through partial trimerization of isophoronediisocyanate.

Other original materials for the production of the compositions according to the invention are isophoronediisocyanate containing urea- or biuret- and/or carbodiimide groups.

Production of isophoronediisocyanate containing urea groups follows the teaching of German DE-OS No. 23 41 065 Federal Republic of Germany, published Feb. 27, 1971, by reaction of isophoronediisocyanate and $H_2O$ at 80° C. The reaction is finished when 1 mole of $CO_2$ has developed per mole of $H_2O$. The urea content in a reaction mixture of isophoronediisocyanate and $H_2O$ can be freely adjusted through the relationship of isophoronediisocyanate to $H_2O$. The production of isophoronediisocyanate containing biuret groups proceeds in like manner to that for the production of isophoronediisocyanate containing urea groups (German DE-OS No. 23 08 015). Here the reaction of isophoronediisocyanate with the $H_2O$, possibly in the presence of catalysts 0.1–2%, such as tertiary amines, for example, takes place in two steps, in the first step the two components are heated at 80° C. long enough for 1 mole $CO_2$ per mole $H_2O$ to be separated. In the second step the reaction mixture is heated at 160° C. long enough for the NCO-content of the reaction mixture to have decreased by 3 NCO-equivalents per mole of $H_2O$.

The production of isophoronediisocyanate containing carbodiimide groups takes place through catalytic reaction of isophoronediisocyanate with phospholine oxide according to the teaching of U.S. Pat. No. 29 41 966 at 150°–190° C. The separated $CO_2$ quantity is a measure of the concentration of the carbodiimide groups in the reaction mixture.

To carry out the blocking reaction the isocyanate component is generally collected and ε-caprolactam is added to it. The reaction can be carried out in substance or in the presence of suitable (inert) solvents. The blocking reaction is generally carried out at 80°–140° C. Accelerating catalysts such as tin-II-octoate and/or tertiary amines can also be used for the isocyanate-polyaddition reaction. The catalysts are added, as a rule, in an amount between 0.001–1% by weight, based on the amount of compounds with isocyanate reactive hydrogen atoms.

The preferred polyisocyanates containing isocyanate groups are characterized, in addition, by an isocyanurate group content (considered $CO—N)_3$), a urea group content

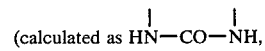
(calculated as HN—CO—NH, a biuret group content (calculated as

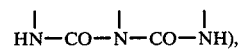
HN—CO—N—CO—NH), and a carbodiimide group content (calculated as —N=C=N—), of 2% by weight to 14% by weight, preferably 3–8% by weight.

The content of NCO-groups present in end blocked form (calculated as NCO) of the product of the method according to the invention is 3–20, preferably 8–18% by weight, that of the free NCO-groups is 1–8% by weight, preferably 2–5% by weight.

The products of the method are particularly suited as hardeners for thermoplastic compounds exhibiting Zerivitnov active hydrogen atoms. In combination with compounds exhibiting Zerivitnov-active hydrogen atoms, the products of the method form systems which precipitation-harden into high quality plastics above 120° C., preferably at 160°–220° C.

Having now described this invention, the same will be further understood by reference to certain specific examples which are included herein for purposes of illustration only and are not intended to be limiting of the invention or any embodiments thereof.

EXAMPLE 1

(a) Production of isophoronediisocyanate adducts from isophoronediisocyanate and diethylene glycol 106 parts by weight (p.b.w.) of diethylene glycol were trickled into 440 p.b.w. of isophoronediisocyanate at 80° C. with vigorous stirring. After the diethylene glycol was added, the mixture was heated for 2 hours at 100° C. to complete the reaction. The NCO-content of the reaction product was 15.1%.

(b) ε-Caprolactam blocking of the isophoronediisocyanate adduct.

147 p.b.w. of ε-caprolactam were added to 550 p.b.w. of the isophoronediisocyanate adducts produced in 1a in such a manner that the reaction temperature did not climb to more than 110° C. The reaction mixture was held at 120° C. for 2 more hours to complete the reaction.

| | |
|---|---|
| Free NCO | 4.2% |
| Blocked NCO | 7.8% |
| Melting range | 68–72° C. |
| Second order transition temperature (DTA) | 30–41° C. |

EXAMPLE 2

ε-caprolactam blocking of the isophoronediisocyanate adduct described in 1a.

180.8 p.b.w. of ε-caprolactam were added at 110° C. to 550 p.b.w. of the isophoronediisocyanate-diethylene glycol-adduct produced in 1a in such a manner that the reaction temperature did not climb to more than 120°. The reaction mixture was held 2 hours more at about 125° to complete the reaction.

| Free NCO | 2.3% |
|---|---|
| Blocked NCO | 9.3% |
| Melting range | 70–75° C. |
| Second order transition temperature (DTA) | 33–42° C. |

EXAMPLE 3

ε-caprolactam blocking of the isophoronediisocyanate adduct described in 1a.

At 110° C. 203.4 p.b.w. of ε-caprolactam were added to 550 p.b.w. of the isophoronediisocyanate-diethylene glycol-adduct produced in 1a in such a manner that the reaction temperature did not rise above 130°. The mixture was heated 2–3 hours more at 120° C. to complete the transfer.

| Free NCO | 1.1% |
|---|---|
| Blocked NCO | 10.0% |
| Melting range | 73–77° C. |
| Second order transition temperature (DTA) | 36–43° C. |

EXAMPLE 4

(a) Production of isophoronedisocyanate/isocyanurate-mixture 1000 p.b.w. of isophoronediisocyanate were heated with 0.5 p.b.w. of the catalyst system consisting of 1,4-diazabicyclo-octane-(2,2,2) (Dabco ®) and Propylenoxide-1,2 (weight ratio: Dabco:propylene oxide=1.2) for 2 hours at 140° C. The progress of the trimerization was tracked with the help of the refraction index. The catalyst was deactivated at an NCO content of ca. 24% by evacuating for half an hour at 20 terr. After cooling, the reaction mixture had an NCO content of 22.9%.

(b) Blocking the isophoronedisocyanate/isocyanurate mixture produced in 4a

At 120° C. 96 p.b.w. of ε-caprolactam were added to 183.4 p.b.w. of this isocyanato-isocyanurate mixture produced in 4a, in such a manner that the reaction temperature did not exceed 130° C. The transfer product was held at 130° C. for another hour to complete the reaction.

| Free NCO | 2.25% |
|---|---|
| Blocked NCO | 12.7% |
| Melting range | 102–106° C. |
| Second order transition temperature (DTA) | 38–65° C. |

EXAMPLE 5

ε-caprolactam blocking of the isocyanato-isocyanurate mixture produced in 4a

At 115° C. 84.7 p.b.w. of ε-caprolactam were added to 183.4 p.b.w. of the isocyanato-isocyanurate mixture produced in 4a in such a manner that the reaction temperature did not exceed 120° C. to complete the reaction.

| Free NCO | 3.9% |
|---|---|
| Blocked NCO | 11.7% |
| Melting range | 98–102° C. |
| Second order transition temperature (DTA) | 35–63° C. |

EXAMPLE 6

(a) Production of the isocyanate-isocyanurate mixture 1000 p.b.w. of isophoronediisocyanate were heated for 2.5 hours at 140° C. with the catalyst mixture similar to 4a. During this time the NCO-content in the reaction mixture fell to about 23% NCO. The deactivation of the catalyst was done analogously to 4a. After cooling the NCO-content in the reaction mixture is 20.9%.

(b) Blocking the isocyanato-isocyanurate mixture produced in 6a with ε-caprolactam.

1000 p.b.w. of isophoronediisocyanate were heated with the catalyst system analogous to 4a for 3 hours at 120° C. During this time the original NCO content of the product fell from 37.8% to ca. 29% NCO. It was then cooled as rapidly as possible to room temperature, at which even after several weeks the NCO-content had changed only insignificantly. The yet low viscosity reaction mixture was then sent through thin-film distillation without first deactivating the catalyst. The monomer was distilled at 150°–160° C./0.1 torr. The distillate has an NCO-content of 17.9%. This monomer-free isocyanatoisocyanurate has a melting range of 86°–89° C.

(b) ε-caprolactam blocking of the isocyanato-isocyanurate produced in 7a.

At 160° C. 96 p.b.w. of ε-caprolactam were added in portions to 234.6 p.b.w. of the isocyanato-isocyanurate produced in 7a in such a manner that the reaction temperature did not exceed 165° C. The mixture was heated another hour at 165° C. to complete the reaction.

| Free NCO | 1.9% |
|---|---|
| Blocked NCO | 10.8% |
| Melting range | 132–155° C. |
| Second order transition temperature (DTA) | 65–87° C. |

EXAMPLE 8

(a) Production of the isophoronediisocyanate/isocyanurate mixture.

1000 p.b.w. of isophoronediisocyanate were heated with 0.6 p.b.w. of the catalyst system described in 4a for 12.5 hours at 140° C. During this time the NCO-content of the reaction mixture fell to 27.5%. After cooling to room temperature the NCO-content of the reaction mixture was 26%. Vacuum was applied as the reaction mixture cooled.

(b) Blocking the isophoronediisocyanate/isocyanurate mixture.

At 1000° C. 77.6 p.b.w. of ε-caprolactam were added in portions to 161.5 p.b.w. of the isocyanate containing isocyanurate groups produced in 8a in such a manner that the reaction temperature did not exceed 120° C. to complete the reaction.

| Free NCO | 5.49 |
|---|---|
| Blocked NCO | 12.06. |
| Melting range | 721-80° C. |
| Second order transition temperature (DTA) | 40-53° C. |

EXAMPLE 9

(a) Production of the isophoronediisocyanate/isocyanurate mixture.

1000 p.b.w. of isophoronediisocyanate were heated with 0.6 p.b.w. of the catalyst system described in 4a for 2 hours at 140° C. During this time the NCO-content of the reaction mixture fell to 26.3% NCO. Then it was cooled to room temperature under vacuum (10 torr). The NCO-content was 24%.

(b) Blocking the isophoronediisocyanate/isocyanurate mixture.

At 110° C. 78.6 p.b.w. of ε-caprolactam were added in portions to 179 p.b.w. of the isocyanatoisocyanurate produced in 9a. After adding the ε-caprolactam the reaction mixture was heated two more hours at 125° C. to complete the conversion.

| Free NCO | 5.03% |
|---|---|
| Blocked NCO | 11.52% |
| Melting range | 89-95° C. |
| Second order transition temperature (DTA) | 64-73° C. |

EXAMPLE 10

(a) Production of an isophoronediisocyanate adduct.

At 100° C. 1712 p.b.w. of 1-hydrogen-3 aminoethyl-3,5,5-trimethylcyclohexane added in portions and heated until the NCO-content of the reaction mixture reached 27.8%.

(b) Blocking the isophoronediisocyanate adduct.

At 100° C. 1017 p.b.w. of ε-caprolactam were added within one hour and the mixture was heated two more hours a 120° C. to complete the reaction.

| Free NCO | 1.6% |
|---|---|
| Blocked NCO | 15% |
| Melting range | 69-73° C. |
| Second order transition temperature (DTA) | 40-48° C. |

EXAMPLE 11

(a) Production of the isophoronediisocyanate adduct.

766 p.b.w. of isophoronediisocyanate were heated at 80° C. with 18 p.b.w. of H₂O until the NCO-content of the reaction mixture fell to 27.8%.

(b) Blocking the isophoronediisocyanate adduct.

151 p.b.w. of the isophoronediisocyanate containing urea groups produced in a were mixed in proportions with 84.75 p.b.w. of ε-caprolactam ε-caprolactam at 120° C. The reaction mixture was heated further at 120° C. until its NCO-content fell to 4.5%.

What is claimed as new and intended to be covered by Letters Patent of the United States is:

1. A method for producing isophoronediisocyanate adducts containing free NCO- and NCO-groups end blocked with ε-caprolactam, wherein the isophoronediisocyanate adducts and ε-caprolactam are mixed in such a proportion that 0.1–1 mole of NCO-groups remain free per mole of isophoronediisocyanate adduct wherein said adducts are selected from the group consisting of:

trimerized isophoronediisocyanate alone or in a mixture with monomer isophoronediisocyanate and having an NCO-content of 17–35% by weight,
   isophoronediisocyanate containing urea groups and having an NCO-content of 22–35% by weight,
   isophoronediisocyanate containing biuret groups and having an NCO-content of 20–35% by weight,
   isophoronediisocyanate containing carbodiimide groups and having an NCO-content of 22–35% by weight, and
   an isophoronediisocyanate adduct exhibiting urea and urethane groups of 1-hydroxy-3-aminomethyl-3,5,5-trimethylcyclohexane and isophoronediisocyanate.

2. Method according to claim 1, wherein the isophoronediisocyanate adduct comprises trimerized isophoronediisocyanate alone or in a mixture with monomer isophoronediisocyanate and has an NCO-content of 17–35% by weight.

3. Method according to claim 1, wherein the isophoronediisocyanate adduct comprises isophoronediisocyanate adduct exhibiting urea and urethane groups of 1-hydroxy-3-aminomethyl-3,5,5-trimethylcyclohexane and isophoronediisocyanate.

4. Adducts containing free NCO-groups and NCO-groups blocked with ε-caprolactam, produced according to claim 1.

5. The method of claim 1, wherein said ε-caprolactam and said isophoronediisocyanate adducts are mixed in a proportion such that 0.1–0.4 moles of NCO-groups remain free per mole of isophoronediisocyanate adduct.

* * * * *

UNITED STATES PATENT AND TRADEMARK OFFICE
CERTIFICATE OF CORRECTION

PATENT NO. : 4,313,876
DATED : Feb. 2, 1982
INVENTOR(S) : Rainer Gras, et. al.

It is certified that error appears in the above—identified patent and that said Letters Patent is hereby corrected as shown below:

Please correct the Title Information to read as follows:

[54]---PRODUCTION OF

ISOPHORONEDIISOCYANATE ADDUCTS

CONTAINING FREE NCO-GROUPS AND

NCO-GROUPS END BLOCKED WITH e-CAPROLACTAM

Signed and Sealed this

Fifteenth Day of June 1982

[SEAL]

Attest:

Attesting Officer

GERALD J. MOSSINGHOFF

Commissioner of Patents and Trademarks